United States Patent
Vedder

(10) Patent No.: US 11,447,924 B2
(45) Date of Patent: Sep. 20, 2022

(54) BOOM MOUNTING ASSEMBLY AND METHOD FOR CONTROLLING OPERATION OF A BOOM MOUNTING ASSEMBLY

(71) Applicant: Kverneland Group Nieuw-Vennep B.V., Nieuw-Vennep (NL)

(72) Inventor: Gert-Jan Vedder, Ter Aar (NL)

(73) Assignee: KVERNELAND GROUP NIEUW-VENNEP B.V., Nieuw-Vennep (NL)

( * ) Notice: Subject to any disclaimer, the term of this patent is extended or adjusted under 35 U.S.C. 154(b) by 110 days.

(21) Appl. No.: 16/954,603

(22) PCT Filed: Nov. 30, 2018

(86) PCT No.: PCT/EP2018/083236
§ 371 (c)(1),
(2) Date: Jun. 17, 2020

(87) PCT Pub. No.: WO2019/120953
PCT Pub. Date: Jun. 27, 2019

(65) Prior Publication Data
US 2020/0332492 A1  Oct. 22, 2020

(30) Foreign Application Priority Data
Dec. 21, 2017  (EP) .................................. 17209536

(51) Int. Cl.
*A01M 7/00* (2006.01)
*E02F 3/38* (2006.01)
(Continued)

(52) U.S. Cl.
CPC ............... *E02F 3/386* (2013.01); *E02F 3/30* (2013.01); *E02F 3/425* (2013.01); *E02F 3/435* (2013.01);
(Continued)

(58) Field of Classification Search
USPC .......................... 238/168; 294/81.3; 239/159
See application file for complete search history.

(56) References Cited

U.S. PATENT DOCUMENTS

| | | | |
|---|---|---|---|
| 3,223,330 A * | 12/1965 | La Plante | A01M 7/0053 239/168 |
| 4,561,591 A | 12/1985 | Ballu | |
| 9,565,847 B2 * | 2/2017 | Ballu | A01M 7/0057 |

FOREIGN PATENT DOCUMENTS

| | | |
|---|---|---|
| DE | 102015101032 A1 | 1/2015 |
| EP | 1444894 A1 | 8/2004 |

(Continued)

OTHER PUBLICATIONS

European Patent Office Search Report dated Mar. 6, 2019, in reference to co-pending European Patent Application No. PCT/EP2018/083236 filed Nov. 30, 2018.

*Primary Examiner* — Ronald P Jarrett
(74) *Attorney, Agent, or Firm* — Leason Ellis LLP

(57) ABSTRACT

A boom mounting assembly for attachment to an agricultural machine is disclosed, which may comprise a primary frame, and a boom support frame configured to support a boom and being suspended from the primary frame to pivot in a transverse plane around a longitudinal axis of rotation provided in a pivot point. The boom support frame may comprise a first sub-frame connected to the primary frame; a second sub-frame supported by the first sub-frame in support sections provided on opposite sides of the pivot point in a transverse direction; and an actuator connected to the sub-frames and operable such that the support sections move relative to the pivot point to increase and decrease, in the transverse direction, a respective distance on opposite sides of the pivot point at the same time. Further, a method for controlling operation of a boom mounting assembly attached to an agricultural machine is provided.

20 Claims, 5 Drawing Sheets

Figure 1:
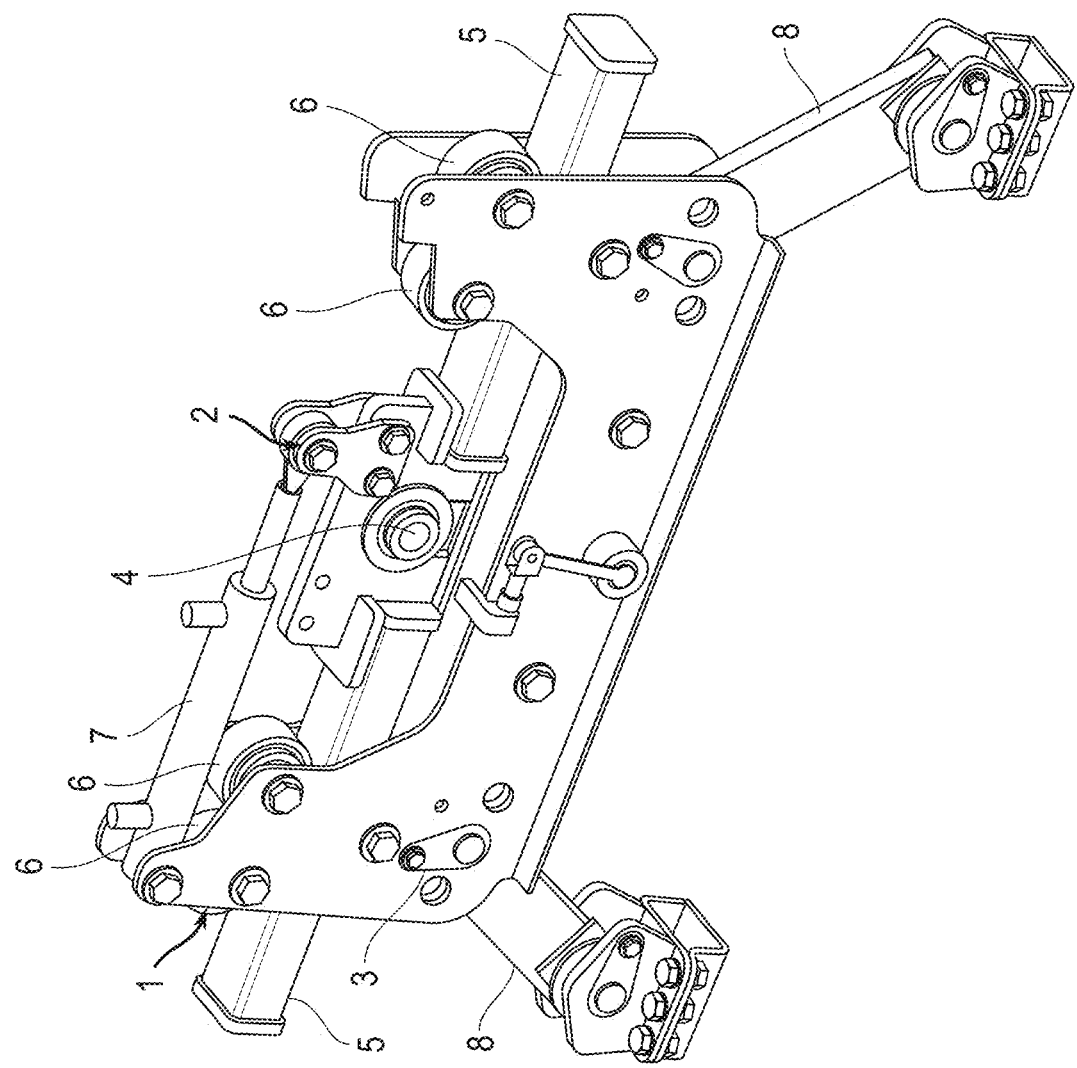

(51) Int. Cl.
*E02F 3/30* (2006.01)
*E02F 3/42* (2006.01)
*E02F 3/43* (2006.01)
*A01C 23/00* (2006.01)

(52) U.S. Cl.
CPC ............ *A01C 23/00* (2013.01); *A01M 7/0053* (2013.01); *A01M 7/0057* (2013.01)

(56) References Cited

FOREIGN PATENT DOCUMENTS

| | | | |
|---|---|---|---|
| EP | 2403331 | B1 | 3/2010 |
| GB | 2153194 | A | 5/1984 |

\* cited by examiner

BOOM MOUNTING ASSEMBLY AND METHOD FOR CONTROLLING OPERATION OF A BOOM MOUNTING ASSEMBLY

CROSS-REFERENCE TO RELATED APPLICATIONS

This patent application is a national stage of International Application No. PCT/EP2018/083236, filed on Nov. 30, 2018, which claims the priority from European Application No. EP 17209536.6, filed Dec. 21, 2017, both of the aforementioned applications are hereby incorporated by reference in their entireties.

The present disclosure refers to a boom mounting assembly for attachment to an agricultural machine and a method for controlling operation of a boom mounting assembly.

BACKGROUND

For dispensing spray material, such as pesticides, herbicides, fungicides or fertilizer, on a field, an application machine may be provided. For example, a tractor may be equipped with an application machine with a boom from which such spray material is dispensed, for example via nozzles attached to the boom. Alternatively, a self-contained application machine may be provided with a boom from which spray material is dispensed.

To ensure uniform dispensing and avoid damage to the boom, the boom may be equipped with a balance system for balancing the boom in a desired position, for example a horizontal position. For this, a movement of the boom relative to other components of the application machine may be permitted. In some circumstances, such as when the ground the spray material is dispensed onto is inclined, it may be desirable to balance the boom in a non-horizontal position.

A boom mounting assembly for attachment to an agricultural application machine is disclosed in document EP 2 403 331 A1. The assembly comprises a boom support frame which is suspended from a primary frame mounted to a chassis. The boom support frame comprises a transverse beam for supporting an intermediate section of a fluid application boom. The suspension mechanism allows both yaw and pitch of boom support frame relative to the primary frame resulting from fore and aft forces on the boom. Dampers are each connected between the primary frame and the boom support frame at a position spaced from the transverse center of the assembly. Damping of pitch and asymmetrical yaw movement of the transverse beam away from a neutral position is controlled by the first and second dampers.

Document EP 1 444 894 A1 discloses a roll control system for controlling a roll position of a boom rotatably coupled to a support frame. The boom comprises left and right wing sections. A roll control mechanism is configured for rotating the boom relative to the support frame in response to a roll control signal. A wing section position measuring apparatus is configured for producing a right wing signal correlatable to a distance between the right wing section and a right wing reference position and a left wing signal correlatable to a distance between the left wing section and a left wing reference position. A boom roll position measuring apparatus is configured for producing a boom roll signal correlatable to a roll position of the boom relative to a boom roll reference position. A controller is configured for identifying a wing section differential value and a boom roll value derived from the right and left wing signals and the boom roll signal, respectively. The controller is moreover configured for identifying a boom roll control error value derived from the wing section differential value and the boom roll value, the boom roll error control value being configured for deriving therefrom the roll control signal.

Document DE 10 2015 101 032 A1 discloses an agricultural machine for discharging liquid, including a boom, a frame to which the boom is fixed such that the boom can be rotated about an axis of rotation pointing in the direction of travel, an actuating cylinder for rotating the boom about the axis of rotation, and a measurement and control system for the actuation of the actuating cylinder. The actuating cylinder is mechanically connected to the frame on one side and mechanically connected to the boom on the other side for the direct introduction of force. The actuating cylinder is formed as a double-acting actuating cylinder having a piston, to which pressure can be applied on both sides in order to move the boom in opposite directions of rotation.

Document GB 2 153 194 A discloses an apparatus for spraying fluids on a ground surface having a fluid distribution member which is journaled on a tractor frame by means of a balancing device. The balancing device comprises a carrier fastened to the frame and having a curved top surface on which the distribution member bears for oscillation. Thus, unevennesses in the ground surface can easily be compensated for. Further, adjustable means are provided for displacing the centre of gravity of the distribution member bearing in the carrier, just in case the apparatus has to operate under varying land conditions, such as a transition from flat land to sloping land or vice versa.

Document U.S. Pat. No. 4,561,591 A relates to a mobile spraying apparatus, particularly for the treatment of plants. This apparatus comprises a spray-distributor which is carried above the ground by a tractor vehicle or trailer vehicle in an approximately horizontal position. The distributor is suspended below a support carried by the vehicle in the manner of a pendulum, by means of a ball-and-socket bearing, so as to remain approximately horizontal, and it is guided by rollers rolling on appropriate surfaces.

SUMMARY

It is an object of the present disclosure to provide a boom mounting assembly for attachment to an agricultural machine and a method for controlling operation of a boom mounting assembly in which improved operation on slopes is provided.

For solving the object, a boom mounting assembly for attachment to an agricultural machine according to claim 1 as well as a method for controlling operation of a boom mounting assembly according to claim 12 are provided. Further embodiments are the subject of dependent claims.

According to an aspect, a boom mounting assembly for attachment to an agricultural machine is provided. The boom mounting assembly comprises a primary frame and a boom support frame configured to support a boom and suspended from the primary frame such that the boom support frame can pivot in a transverse plane around a longitudinal axis of rotation provided in a pivot point. The boom support frame comprises a first sub-frame connecting to the primary frame, a second sub-frame supported by the first sub-frame in support sections provided, in a transverse direction, on opposite sides of the pivot point, and an actuator connecting to the first and second sub-frames. The actuator is operable such that the support sections can be moved relative to the pivot point, thereby, in a transverse direction increasing a distance between the pivot point and a support section on one side of the pivot point and, at the same time, decreasing a distance between the pivot point and a support section on an opposite side of the pivot point and vice versa.

According to another aspect, a method for controlling operation of a boom mounting assembly attached to an agricultural machine is provided. The boom mounting assembly comprises a primary frame and a boom support frame configured to support a boom and suspended from the primary frame such that the boom support frame can pivot in a transverse plane around a longitudinal axis of rotation provided in a pivot point. The boom support frame comprising a first sub-frame connecting to the primary frame, a second sub-frame supported by the first sub-frame in support sections provided, in a transverse direction, on opposite sides of the pivot point; and an actuator connecting to the first and second sub-frames. The method comprises moving the agricultural machine over a ground; receiving measurement signals in a control unit functionally connected to the actuator, the measurement signals indicative of an inclination angle caused by uneven ground, and generating control signals and providing the control signals to the actuator for operating the actuator in dependence on the measurement signal such that, depending on the inclination angle, the support sections are moved relative to the pivot point, thereby, in a transverse direction increasing a distance between the pivot point and a support section on one side of the pivot point and, at the same time, decreasing a distance between the pivot point and a support section on an opposite side of the pivot point and vice versa.

According to the technologies proposed herein, the second sub-frame is supported by the first sub-frame in support sections. The support sections may be one or more support points or areas in which the second sub-frame is supported by the first sub-frame. When the support sections are moved relative to the pivot point, the support sections may also move relative to the first and/or the second sub-frame. For example, the support sections may be two points of contact between the first sub-frame and the second sub-frame, the points of contact being fixed on the second sub-frame while they move along the first sub-frame when the actuator is operated to move the support sections relative to the pivot point. Alternatively or additionally, the support sections may move relative to subcomponents of the first and/or the second sub-frame but remain fixed relative to the sub-frame as a whole. For example, a separate component of the sub-frame may move relative to the sub-frame and a support section may move along the moving subcomponents while it stays fixed relative to the sub-frame as such. At the points of contact between the first sub-frame and the second sub-frame, corresponding support sections on the first sub-frame and the second sub-frame, respectively, may be provided.

The boom mounting may further comprise a transversely extending frame member, first support sections provided on the transversely extending frame member on both of the opposite sides of the pivot point. The support sections may comprise one or more support points on the transversely extending frame member on each of the opposing sides of the pivot point. The transversely extending frame member may be provided with a hollow profile. For example, the transversely extending frame member may be provided with a square cross-section. Alternatively or additionally, the transversely extending frame member may be provided with a non-hollow profile. For example, the profile may be in the form of a T-beam or an I-beam. The transversely extending frame member may comprise different profiles. For example, the transversely extending frame member may comprise a hollow profile, in sections, and a non-hollow profile, in different sections.

The first sub-frame may be provided with the transversely extending frame member. Alternatively, the second sub-frame may be provided with the transversely extending frame member.

The boom mounting assembly may further comprise support members, the support members providing second support sections on both of the opposite sides of the pivot point and being supported on the transversely extending frame member such that the support members can be moved relative to the transversely extending frame in transverse direction by the actuator. The second support sections may correspond to the first support sections in points of contact between the first sub-frame and the second sub-frame.

One or more support members may be provided on each of the opposite sides of the pivot point. An equal number of support members may be provided on each of the opposite sides of the pivot point. Alternatively, the number of support members provided on one side of the pivot point may be different from the number of support members provided on the opposite side of the pivot point.

In a neutral position of the support sections relative to the pivot point, the respective distance between the pivot point and the support members on each of the opposite sides of the pivot point may be equal. In particular, in embodiments in which more than one support member is provided on each side of the pivot point, the distance between the pivot point and corresponding support members on each of the opposite sides of the pivot point may be equal. In the neutral position, the center of mass of all components suspended from the primary frame may lie vertically below the pivot point. A boom supported by the boom support frame may freely balance in a horizontal position when the support sections are in the neutral position.

The support members may be provided on the second sub-frame. In embodiments, the first sub-frame is provided with the transversely extending frame member and the support members are provided on the second sub-frame. Alternatively, the support members may be provided on the first sub-frame. In embodiments, the second sub-frame is provided with the transversely extending frame member and the support members are provided on the first sub-frame.

The support members may comprise a roller provided on at least one side of the pivot point. Rollers may be provided on each of the opposite sides of the pivot point. On each of the opposite sides of the pivot point, one or more rollers may be provided. The embodiments described with regard to the roller may apply to each or all of the one or more rollers. Each roller may provide at least one support point. A plurality of support points between the first and the second sub-frame may be provided by a plurality of rollers.

The roller may be pivotably supported on the second sub-frame. Alternatively, when the support members are provided on the first sub-frame, the roller may pivotably supported on the first sub-frame. The roller may be supported in a freely rotating manner. The transversely extending frame member may provide a rolling surface on which the roller is supported.

The roller may be provided with a curved surface such as a semicircle shaped surface. Friction may be further reduced.

The support members may each comprise a twin roller assembly. Thereby, one support member may be provided on each of the opposite sides of the pivot point and each of the support members may comprise two rollers in a twin roller assembly.

The roller may be a plastic roller. The plastic roller is made of a plastic material, e.g. thermoplastic material such as thermoplastic polyurethane. In an embodiment, the roller may be made of ultra-high-molecular-weight polyethylene (UHMWPE). Alternatively, the roller may be made of nylon or a polyamide different than nylon. As a further alternative, the roller may be made of a non-polyamide material such as a different polymer, a metal, a metal alloy, rubber or any other suitable material.

The roller may be supported on one of a rolling bearing and a sliding bearing. The rolling bearing may be a ball bearing. The rolling bearing may be made of metal, at least in parts. For example, the rolling bearing may be a steel ball-bearing. The roller may be supported on more than one bearing. For example, the roller may be supported on two steel ball bearings. Alternatively, the roller may be supported by a slide bearing.

The boom mounting assembly may further comprise a control unit functionally connected to the actuator such that the actuator can be operated by control signals provided by the control unit. The control signals may be generated in dependence on measurement signals, for example measurement signals that are indicative of an inclination angle of the ground.

In an exemplary embodiment, when the boom is freely balancing in a horizontal position and, based on sensor signals, an inclination of the ground is determined, the actuator is operated by control signals to move the support sections relative to the pivot point such that the center of gravity of all components suspended from the primary frame shifts and the boom matches the inclination of the ground. The sensor signals may be, for example, sensors indicative of a respective distance of opposite distal ends of the boom to the ground.

The control unit may be provided in a control system. For example, the control unit may be provided in an ISOBUS system, such as a machine control network implementing the ISO 11683-11 standard.

The actuator may be extended and retracted to move the support sections relative to the pivot point. For example, the actuator may comprise a hydraulic cylinder and, to move the support sections relative to the pivot point, the piston of the hydraulic cylinder may be extended out of the barrel of the hydraulic cylinder and/or the piston may be retracted into the barrel.

The pivot point may be provided with a ball joint. For example, the first sub-frame may be provided with a ball joint which rests on an axle extending from the primary frame whereby the boom support frame is suspended from the primary frame. The ball joint may enable at least some rotational movement around more than one axis passing through the pivot point.

The boom support frame may comprise pendulums on opposite sides. The boom may be suspended from the pendulums. For example, two pendulums may be provided on opposite sides of the second sub-frame and the boom may be suspended from the pendulums. The pendulums may provide quick stabilization. For example quick stabilization of the boom may be provided after a rocking movement caused by an agricultural machine comprising the boom mounting assembly moving over an obstacle such as a rock on the ground.

The primary frame may be configured to be mounted on a chassis, for example a chassis of an agricultural machine.

In embodiments, the primary frame may be mounted to a lifting device configured to move the boom supported on the boom mounting assembly up and down for different modes of operation on the field and/or for transport. In such embodiments, the primary frame may also be referred to as a lifting frame.

The boom mounting assembly may be attached to an agricultural machine which may be mounted, for example, to an implement, a self-driving vehicle or a tractor. Alternatively, the agricultural machine may be self-contained, i.e. need not be mounted to another device. The agricultural machine may be a crop sprayer, for example. The agricultural machine may be configured to move over ground or soil, such as a field, to dispense a spray material onto the ground or soil. Dispensing the spray material onto the ground may comprise dispensing the spray material onto the soil or ground, for example of a field, or onto plants growing thereon.

The spray material to be dispensed may, for example, be a pesticide, a fungicide, an herbicide or a fertilizer to be sprayed onto the soil.

The embodiments disclosed above with regard to the boom mounting assembly may apply to the method for controlling operation, mutates mutandis.

The agricultural machine may be an agricultural application machine, for example, configured to move over ground or soil, such as a field, for dispensing a spray material onto the ground or soil. The agricultural application machine may be a sprayer. A plurality of application elements may be provided on the boom. The application elements may comprise a nozzle provided on the boom and configured to dispense the spray material.

Dispensing the spray material onto the ground may comprise dispensing the spray material onto the soil or ground, for example of a field, or onto plants growing thereon. The spray material to be dispensed may, for example, be a pesticide, a fungicide, an herbicide or a fertilizer to be sprayed onto the soil.

DESCRIPTION OF FURTHER EMBODIMENTS

Figure 2:
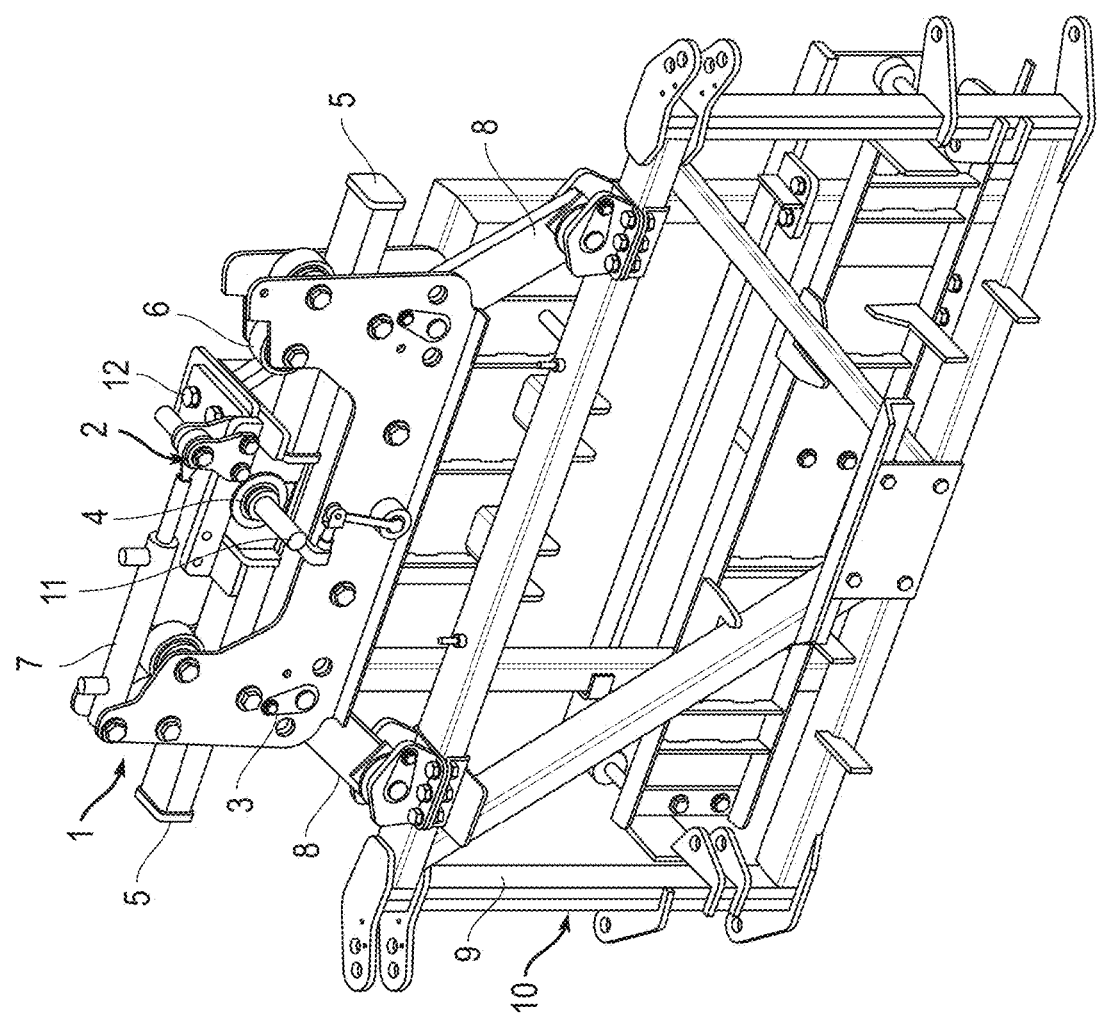
Figure 3:
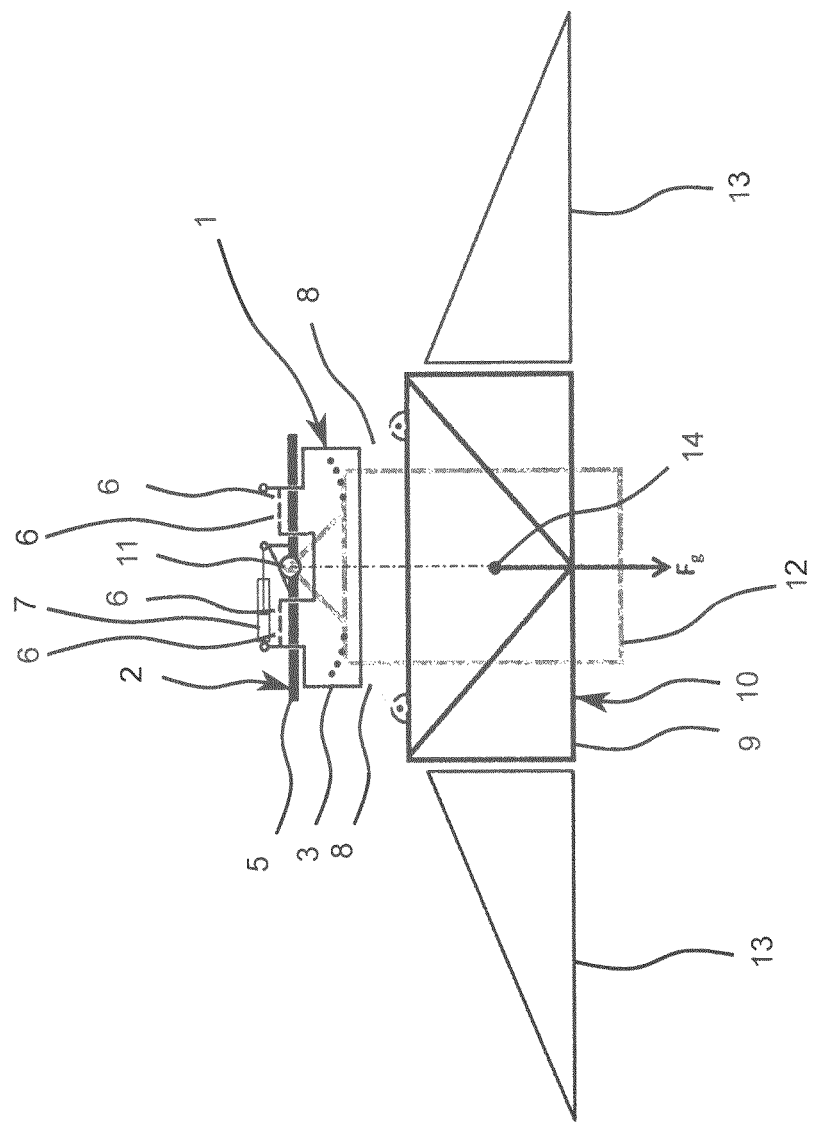
Figure 4:
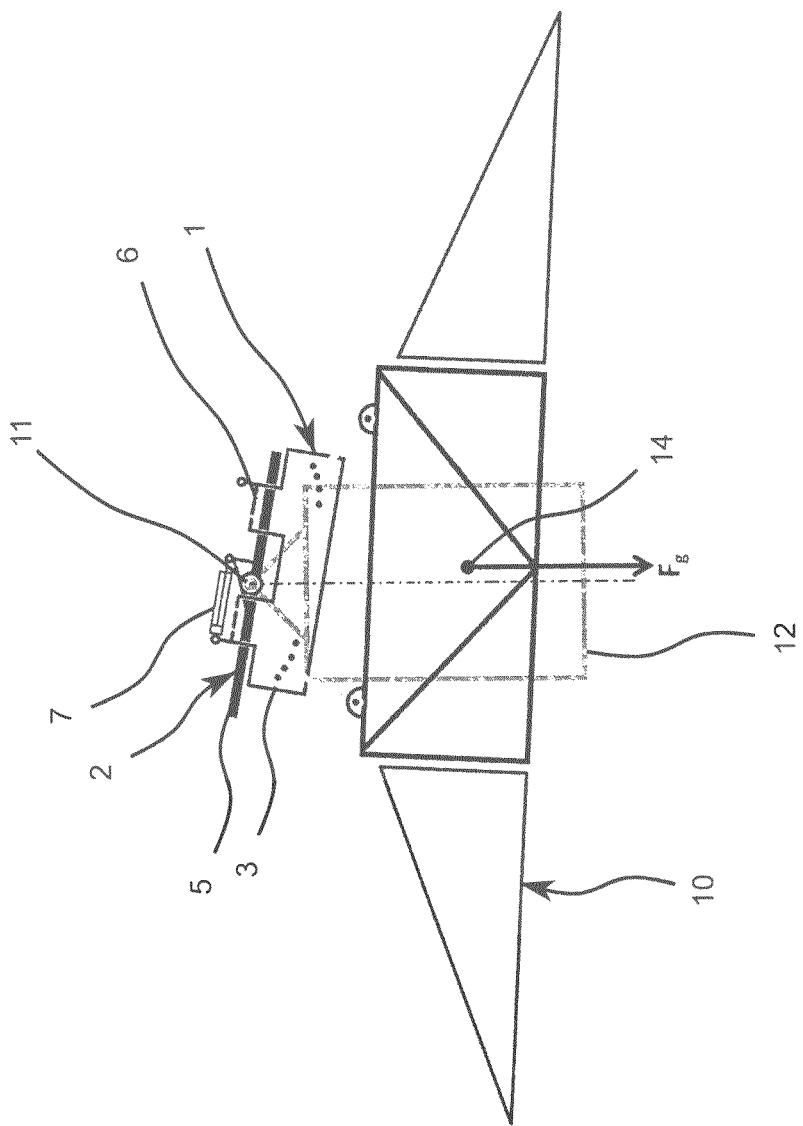
Figure 5:
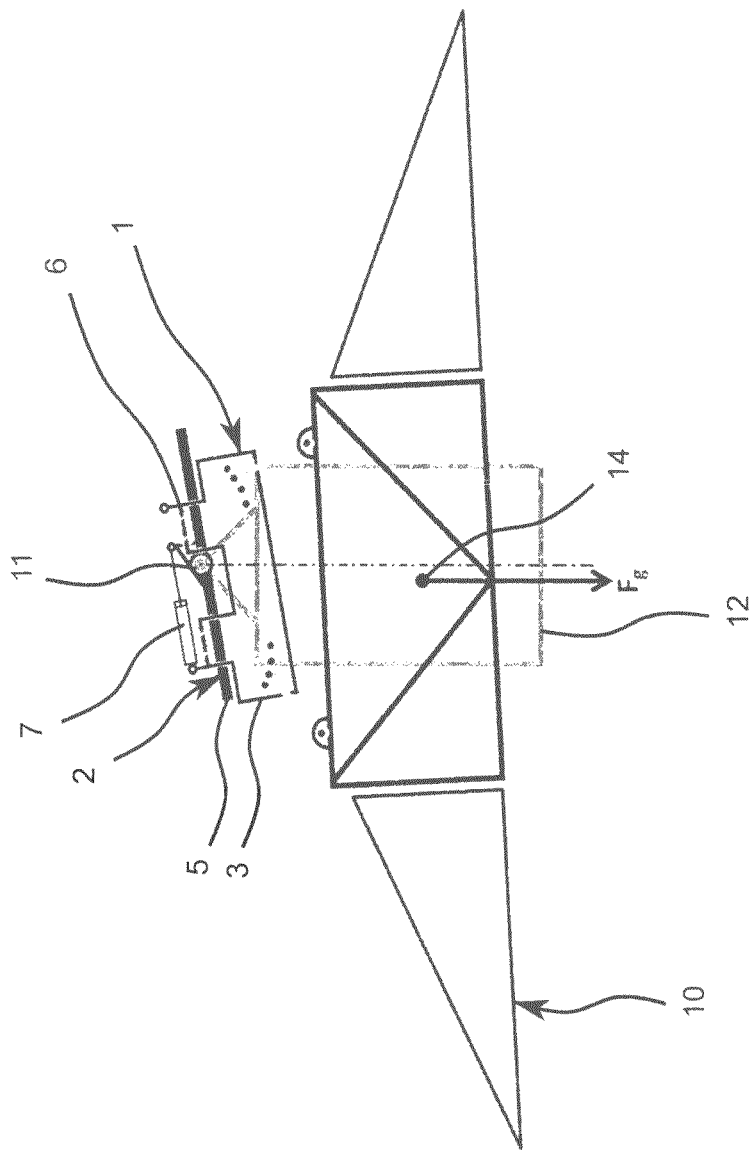

Following, embodiments, by way of example, are described with reference to figures. In the figures show:

FIG. 1 a boom support frame;

FIG. 2 a boom mounting assembly supporting a middle section of a boom;

FIG. 3 a schematic representation of a boom mounting assembly supporting a boom in a neutral position;

FIG. 4 a schematic representation of a boom mounting assembly supporting a boom in an inclined position; and FIG. 5 a schematic representation of a boom mounting assembly supporting a boom in a different inclined position.

FIG. 1 shows a boom support frame 1. The boom support frame 1 comprises a first sub-frame 2 and a second sub-frame 3. The first sub-frame 2 is provided with a ball joint 4 which defines a pivot point of the boom support frame 1. The boom support frame 1 may rotate or pivot in a transverse plane perpendicular to a longitudinal axis defined by the main axis of the ball joint 4. The first sub-frame 2 further comprises a transversely extending frame member 5. The transversely extending frame member 5 comprises a left and a right profile on opposite sides of the ball joint 4. The left and the right profile are each provided with a square cross-section.

Rollers 6 are mounted to the second sub-frame 3 on steel ball bearings (not shown) such that the rollers 6 may freely rotate around a main axis of each roller 6. One twin roller assembly consisting of two rollers 6 is provided on the opposite sides of the ball joint 4. In alternative embodiments, different configurations of rollers 6 may be provided. For example one or more than two rollers 6 may be provided on the opposite sides of the ball joint 4 and/or a different number of rollers 6 may be provided on each of the opposite sides.

The rollers 6 may be plastic rollers made of a plastic material, e.g. thermoplastic material such as thermoplastic polyurethane. In an embodiment, the rollers 6 may be made of ultra-high-molecular-weight polyethylene (UHMWPE). Alternatively, the rollers 6 may be made of nylon or a polyamide different than nylon. As a further alternative, the rollers 6 may be made of a non-polyamide material such as a different polymer, a metal, a metal alloy, rubber or any other suitable material.

The second sub-frame 3 is supported by the first sub-frame 2 by the rollers 6 resting on the transversely extending frame member 5. The rollers 6 may roll along the respective upper surface of the profiles, thereby allowing a transverse movement of the second sub-frame 3 relative to the first sub-frame 2 along the extension of the transversely extending frame member 5. As the rollers 6 and the transversely extending frame member 5 will deform, at least minimally, under a load caused by the gravitational force, an area of contact is defined between each of the rollers 6 and the transversely extending frame member 5. These areas of contact provide support of the second sub-frame 3 on the first sub-frame 2 and may therefore be referred to as support sections. Herein, the areas of contact on the transversely extending frame member 5 may be referred to as first support sections and the areas of contact on the rollers 6 may be referred to as second support sections. When the second sub-frame 3 moves relative to the first sub-frame 2 along the transversely extending frame member 5, the rollers 6 rotate and move along on the respective upper surfaces of the transversely extending frame member 5 such that the area of contact between each roller 6 and the transversely extending frame member 5 moves on the upper surface of the transversely extending frame member 5 as well as on the circumferential surface of the roller 6. Thereby, the first support sections move on the upper surfaces of the profiles of the transversely extending frame member 5 and the second support sections move on the circumferential surface of the roller 6. At the same time, the second support sections do not move relative to the second sub-frame 3 as a whole.

The rollers 6 may be mounted on other bearings that steel ball bearings, for example on roller bearings or needle bearings. Different bearings may be used for each roller 6. Alternatively, a slide bearing may be applied.

An actuator 7 comprising a hydraulic cylinder connects the first sub-frame 2 and the second sub-frame 3. The actuator 7 may be extended, by extending the piston of the hydraulic cylinder out of the barrel of the hydraulic cylinder, and retracted, by retracting the piston of the hydraulic cylinder into the barrel of the hydraulic cylinder. By extending and retracting the actuator 7, the second sub-frame 3 is moved relative to the first sub-frame 2 in a transverse directions by way of the rollers 6 rolling along the respective upper surface of the profiles of the transversely extending frame member 5. Thereby, the support sections are moved relative to the ball joint 4 and the distance along the transversely extending frame member 5 between the ball joint 4 and the support sections on one side of the ball joint 4 is extended while, at the same time, the distance along the transversely extending frame member 5 between the ball joint 4 and the support sections on the opposite side of the ball joint 4 is lowered. In the embodiment shown in FIG. 1, when the actuator 7 is extended, the rollers 6 on the left side, and thus the support sections on the left side, of the ball joint 4 move away from the ball joint 4 and the rollers 6 on the right side, and thus the support sections on the right side, of the ball joint 4 move closer to the ball joint 4. When the actuator 7 is retracted, the rollers 6 on the right side, and thus the support sections on the right side, of the ball joint 4 move away from the ball joint 4 and the rollers 6 on the left side, and thus the support sections on the left side, of the ball joint 4 move closer to the ball joint 4.

In the embodiment shown, actuator 7 comprises a hydraulic cylinder. In alternative embodiments, the actuator 7 may comprise any other suitable component for achieving a movement between the first 2 and second 3 sub-frames. For example, actuator 7 may comprise an electric motor.

The boom support frame 1 further comprises pendulums 8 connected to the second sub-frame 3 on opposite sides. FIG. 2 shows a boom mounting assembly supporting a middle section 9 of a boom 10. The middle section 9 is suspended from the pendulums 8 connected to the second sub-frame 3. The ball joint 4 of the first sub-frame 2 of the boom support section 1 is mounted on an axle 11 of a primary frame 12. The axis of the axle 11 coincides with the main axis of the ball joint 4 and passes through the pivot point around which the boom support frame 1 may rotate in a transverse plane perpendicular to the coinciding axes of the axle 11 and the ball joint 4.

The primary frame 12 may be mounted to an agricultural machine, thereby mounting the boom 10 to the agricultural machine using the boom mounting assembly. By the boom support frame 1 rotating around the pivot point in the transverse plane relative to the primary frame 12, the boom 10 may be balanced, for example when the primary frame 12 moves due to movement of the agricultural machine. Additionally, the ball joint 4 allows limited rotation of the boom support frame 1 relative to the primary frame 12 other than a rotation in the transverse plane around the coinciding axes of the ball joint 4 and the axle 11. The axis of the axle 11 may be parallel to a longitudinal axis of the agricultural machine and/or a direction of movement of the agricultural machine at least in a neutral position of primary frame 12 with regard to the agricultural machine.

FIG. 3 shows a schematic representation of a boom mounting assembly supporting a boom 10. The boom 10 comprises a middle section 9 and outer sections 13 connected to the middle section 9. In FIG. 3, the boom support frame 1 in a neutral position in which each of the support sections on one side of the pivot point defined in the plane of view of FIG. 3 by the axle 11 has the same distance to the pivot point as the respective support section on the opposite side of the pivot point. The combined center of mass 14 of all components supported on the axle 11 lies vertically below the pivot point. Thereby, when free rotation of the boom support frame 1 around the axle 11 is possible, the boom 10 is balanced in a horizontal position, for example when the primary frame 12 moves out of a horizontal position because the agricultural machine moves over an inclined area of ground.

Balancing of the boom 10 in a horizontal position may be desired when the center of the agricultural machine, for example wheel of the agricultural machine, moves over an inclined area of ground while the overall area of ground covered by the boom, defined by the width of the boom from the tip of one outer section 13 to the other outer section 13, extends essentially horizontally. On the other hand, when the overall area of ground covered by the boom 10 is inclined, it may be desirable to balance the boom 10 in an inclined position, even when the center of the agricultural machine moves over a horizontal area of ground.

For balancing the boom 10 in an inclined position, the actuator 7 may be extended or retracted, resulting in a movement of the second sub-frame 3 relative to the first sub-frame 2 and the pivot point. The movement of the second sub-frame 3 relative to the pivot point causes the combined center of mass of all components supported by the ball joint 4 to move laterally out of the vertical position below the pivot point. When free rotation of the boom support frame 1 around the axle 11 is possible, the boom support frame 1 will rotate around the pivot point until the combined center of mass of all components supported by the ball joint 4 again lies vertically below the pivot point. This is illustrated in FIGS. 4 and 5.

FIG. 4 shows the boom mounting assembly of FIG. 3 in which the actuator 7 has been retracted. The resulting movement of the second sub-frame 3 relative to the first sub-frame 2 has caused the rollers 6, and thereby the support sections, on the left side of the pivot point defined by the axle 11 in the plane of view of FIG. 4 to move closer to the pivot point along the transversely extending frame member 5 and the rollers 6 and support sections on the right side of the pivot point to move away from the pivot point, resulting in a shift of the combined center of mass 14 to the right. As a result, the boom support frame 1 and the boom 10 perform a clockwise rotating movement around the pivot point until the combined center of mass 14 again lies below the pivot point, resulting in an inclined position of the boom 10. In FIG. 4, the boom support frame 1 and the boom 10 have not completed the clockwise rotating movement around the pivot point. The boom 10 is in an inclined position, but the combined center of gravity 14 does not yet lie below the pivot point.

FIG. 5 shows the boom mounting assembly of FIG. 3 in which the actuator 7 has been extended. The resulting movement of the second sub-frame 3 relative to the first sub-frame 2 has caused the rollers 6, and thereby the support sections, on the right side of the pivot point defined by the axle 11 in the plane of view of FIG. 5 to move closer to the pivot point along the transversely extending frame member 5 and the rollers 6 and support sections on the left side of the pivot point to move away from the pivot point, resulting in a shift of the combined center of mass 14 to the left. As a result, the boom support frame 1 and the boom 10 perform a counterclockwise rotating movement around the pivot point until the combined center of mass 14 again lies below the pivot point, resulting in an inclined position of the boom 10. In FIG. 5, the boom support frame 1 and the boom 10 have not completed the counterclockwise rotating movement around the pivot point. The boom 10 is in an inclined position, but the combined center of gravity 14 does not yet lie below the pivot point.

In exemplary embodiments of the boom mounting assembly, rotation of the boom support frame 1 around the pivot point is limited to a pre-defined angular range. The angular range of rotation may be defined such that the likelihood of a collision of the outer sections 13 of the boom 10 is decreased, for example when agricultural machine is moving over ground with a steep inclination and the range of movement of the actuator 7, i.e. the range between a fully extended and a fully retracted position of the actuator 7, is not sufficient to achieve balancing of the boom 10 parallel to the ground.

The boom mounting assembly may further comprise a control unit functionally connected to the actuator 7 such that the actuator 7 can be operated by control signals provided by the control unit. Thereby, balancing of the boom 10 in an inclined position may be controlled by the control unit. The control signals may be generated in dependence on measurement signals, for example measurement signals that are indicative of an inclination angle of the ground. For example, the control unit may receive measurement signals indicative of an inclination angle from sensors that may be provided, for example, on the boom 10, and generate control signals in dependence on the measurement signals. The actuator 7 may then be operated according to the control signals to balance the boom 10 in an inclined positions, for example according to FIG. 4 or FIG. 5.

The features disclosed in this specification, the figures and/or the claims may be material for the realization of various embodiments, taken in isolation or in various combinations thereof.

The invention claimed is:

1. A boom mounting assembly for attachment to an agricultural machine, comprising
a primary frame; and
a boom support frame configured to support a boom and suspended from the primary frame such that the boom support frame pivots in a transverse plane around a longitudinal axis of rotation provided in a pivot point, and in which the boom support frame comprises
a first sub-frame connected to the primary frame;
a second sub-frame supported by the first sub-frame in support sections provided, in a transverse direction, on opposite sides of the pivot point; and
an actuator connected to the first and second sub-frames and operable such that the support sections move relative to the pivot point in a transverse direction to increase a distance between the pivot point and a support section on one side of the pivot point and, at the same time, decrease a distance between the pivot point and a support section on an opposite side of the pivot point and vice versa; and
pendulums positioned on opposite sides of the second sub-frame, wherein the boom is suspended from the pendulums.

2. The boom mounting assembly according to claim 1, further comprising a transversely extending frame member, wherein the support sections comprise first support sections, the first support sections provided on the transversely extending frame member on both of the opposite sides of the pivot point.

3. The boom mounting assembly according to claim 2, wherein the first sub-frame is provided with the transversely extending frame member.

4. The boom mounting assembly according to claim 3, further comprising support members, wherein the support sections comprise second support sections, the support members providing the second support sections on both of the opposite sides of the pivot point and being supported on the transversely extending frame member such that the support members can be moved relative to the transversely extending frame in transverse direction by the actuator.

5. The boom mounting assembly according to claim 4, wherein the support members are provided on the second sub-frame.

6. The boom mounting assembly according to claim 5, wherein the support members comprise a roller provided on at least one side of the pivot point.

7. The boom mounting assembly according to claim 6, wherein the support members each comprises a twin roller assembly.

8. The boom mounting assembly according to claim 6, wherein the roller is a plastic roller.

9. The boom mounting assembly according to claim 6, wherein the roller is supported on a bearing.

10. The boom mounting assembly according to claim 9, wherein the bearing is a ball bearing.

11. The boom mounting assembly according to claim 10, further comprising a control unit functionally connected to the actuator such that the actuator can be operated by control signals provided by the control unit.

12. The boom mounting assembly according to claim 2, further comprising support members, the support members providing second support sections on both of the opposite sides of the pivot point and being supported on the transversely extending frame member such that the support members can be moved relative to the transversely extending frame in transverse direction by the actuator.

13. The boom mounting assembly according to claim 12, wherein the support members are provided on the second sub-frame.

14. The boom mounting assembly according to claim 12, wherein the support members comprise a roller provided on at least one side of the pivot point.

15. The boom mounting assembly according to claim 14, wherein the support members each comprises a twin roller assembly.

16. The boom mounting assembly according to claim 14, wherein the roller is a plastic roller.

17. The boom mounting assembly according to at least one of the claim 14, wherein the roller is supported on a bearing.

18. The boom mounting assembly according to claim 17, wherein the bearing is a ball bearing.

19. The boom mounting assembly according to claim 1, further comprising a control unit functionally connected to the actuator such that the actuator can be operated by control signals provided by the control unit.

20. A method for controlling operation of a boom mounting assembly attached to an agricultural machine, the boom mounting assembly having a primary frame; and a boom support frame configured to support a boom and suspended from the primary frame such that the boom support frame can pivot in a transverse plane around a longitudinal axis of rotation provided in a pivot point, the boom support frame comprising a first sub-frame connecting to the primary frame; a second sub-frame supported by the first sub-frame in support sections provided, in a transverse direction, on opposite sides of the pivot point; and an actuator connecting to the first and second sub-frames; and pendulums positioned on opposite sides of the second sub-frame, wherein the boom is suspended from the pendulums; and the method comprising:

moving the agricultural machine over a ground;

receiving measurement signals in a control unit functionally connected to the actuator, the measurement signals indicative of an inclination angle caused by uneven ground; and generating control signals and providing the control signals to the actuator for operating the actuator in dependence on the measurement signal such that, depending on the inclination angle, the support sections are moved relative to the pivot point, thereby, in a transverse direction increasing a distance between the pivot point and a support section on one side of the pivot point and, at the same time, decreasing a distance between the pivot point and a support section on an opposite side of the pivot point and vice versa.

* * * * *